United States Patent
Lim et al.

(10) Patent No.: US 9,016,870 B2
(45) Date of Patent: Apr. 28, 2015

(54) PROJECTOR AND DISPLAY APPARATUS HAVING THE SAME

(75) Inventors: Jae-geun Lim, Suwon-si (KR); Jun-seok Park, Suwon-si (KR); Jean Hur, Seongnam-si (KR); Sung-je Woo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 13/613,957

(22) Filed: Sep. 13, 2012

(65) Prior Publication Data

US 2013/0077054 A1    Mar. 28, 2013

(30) Foreign Application Priority Data

Sep. 27, 2011    (KR) .................. 10-2011-0097599

(51) Int. Cl.
*G03B 21/18*    (2006.01)
*G03B 21/16*    (2006.01)

(52) U.S. Cl.
CPC ...................................... *G03B 21/16* (2013.01)

(58) Field of Classification Search
CPC ........ G03B 21/16; G03B 21/14; G03B 21/18; H04N 9/3141; H04N 9/3144; G06F 1/20; G06F 1/203
USPC ............. 353/31, 52, 54, 57, 61, 99, 119, 122; 165/80.3, 104.33, 121, 104.15, 185, 165/905; 361/697, 679.47, 679.48, 679.54, 361/695, 696; 362/494, 464, 485, 373, 226, 362/230, 516, 30, 545
See application file for complete search history.

(56) References Cited

U.S. PATENT DOCUMENTS

| | | | |
|---|---|---|---|
| 6,698,899 B2 | 3/2004 | Yamada et al. | |
| 6,751,027 B2 * | 6/2004 | Van Den Bossche et al. ............... | 359/634 |
| 6,902,275 B2 | 6/2005 | Yamada et al. | |
| 6,966,654 B2 | 11/2005 | Ozawa et al. | |

(Continued)

FOREIGN PATENT DOCUMENTS

| | | |
|---|---|---|
| EP | 1 195 640 A1 | 4/2002 |
| EP | 1 391 777 A1 | 2/2004 |

(Continued)

OTHER PUBLICATIONS

Communication dated Dec. 26, 2012 issued by the International Searching Authority in counterpart International Application No. PCT/KR2012/007729 (PCT/ISA/210).

(Continued)

*Primary Examiner* — Sultan Chowdhury
(74) *Attorney, Agent, or Firm* — Sughrue Mion, PLLC

(57) ABSTRACT

The projector according to an exemplary embodiment includes an optical system which forms, expands, and projects the image, and includes at least one light source; a light source dissipation unit for dissipating heat generated by the light source; a plurality of circuit boards for operating the projector; an intake unit having an intake opening where external air is received; an exhaust unit having an exhaust opening where the received air is expelled; and a flow path dividing unit which divides a cooling flow path formed between the intake opening and the exhaust opening into an upper cooling flow path and a lower cooling flow path, wherein the light source dissipation unit is placed on the upper cooling flow path and at least one of the plurality of circuit boards is placed on the lower cooling flow path.

20 Claims, 10 Drawing Sheets

(56) References Cited

U.S. PATENT DOCUMENTS

| | | | |
|---|---|---|---|
| 7,364,308 B2 | 4/2008 | Murasugi | |
| 7,866,852 B2 * | 1/2011 | Kulkarni | 362/294 |
| 8,052,282 B2 * | 11/2011 | Chen et al. | 353/52 |
| 2002/0039174 A1 | 4/2002 | Yamada et al. | |
| 2004/0114113 A1 | 6/2004 | Yamada et al. | |
| 2004/0169825 A1 | 9/2004 | Ozawa et al. | |
| 2005/0195460 A1 * | 9/2005 | Fujimori et al. | 359/237 |
| 2006/0056182 A1 | 3/2006 | Murasugi | |
| 2007/0000650 A1 * | 1/2007 | Nishimura | 165/121 |
| 2007/0024814 A1 * | 2/2007 | Woo et al. | 353/52 |
| 2010/0033689 A1 * | 2/2010 | Overmann et al. | 353/61 |
| 2010/0053896 A1 * | 3/2010 | Chen et al. | 361/697 |
| 2010/0091252 A1 * | 4/2010 | Namba et al. | 353/61 |
| 2011/0188008 A1 * | 8/2011 | Maeda et al. | 353/85 |

FOREIGN PATENT DOCUMENTS

| | | |
|---|---|---|
| EP | 1 635 563 A2 | 3/2006 |
| KR | 1999-008986 U | 3/1999 |
| KR | 2002-0025787 A | 4/2002 |
| KR | 2003-0019625 A | 3/2003 |
| KR | 10-2006-0051118 A | 5/2006 |
| WO | 02/097529 A1 | 12/2002 |

OTHER PUBLICATIONS

Communication dated Dec. 26, 2012 issued by the International Searching Authority in counterpart International Application No. PCT/KR2012/007729 (PCT/ISA/237).

* cited by examiner ered in a longitudinal direction of the projector so that the length of the projector is not minimized. Therefore, there needs to be a solution for placing the irradiating window of the projector in the center of the projector and minimizing the length of the projector at the same time.

PROJECTOR AND DISPLAY APPARATUS HAVING THE SAME

CROSS-REFERENCE TO RELATED APPLICATIONS

This application claims priority from Korean Patent Application No. 2011-0097599, filed in the Korean Intellectual Property Office on Sep. 27, 2011, the disclosure of which is incorporated herein by reference.

BACKGROUND

1. Field

Methods and apparatuses consistent with the exemplary embodiments relate to a projector and display apparatus having the same, and more particularly, to a short-focus projector and a display apparatus having the same.

2. Description of the Related Art

A display apparatus which uses a projector and a screen displays an image by expanding and projecting the image on the screen through the projector. For example, this type of display apparatus can be applied to televisions.

In terms of appearance, it is desirable that an irradiating window of the projector is placed in a center of the projector without leaning towards the left or right, and the width from the left to right of the projector, that is a length, should have a minimum size. Most of the times however, the irradiating window of the projector leans towards either the left or right, and at least a portion of a projection lens unit equipped within the projector is extended in a longitudinal direction of the projector so that the length of the projector is not minimized. Therefore, there needs to be a solution for placing the irradiating window of the projector in the center of the projector and minimizing the length of the projector at the same time.

Meanwhile, a general projector includes a light source for generating light (for instance, LEDs etc.) and a plurality of circuit boards. In addition, in the case where a projector has a plurality of LEDs as light source, the projector also has a plurality of radiating units for radiating those LEDs (for instance, a combination of a heat pipe and a radiating fin). Generally in such a case, either at least two radiating units are placed in series on a cooling flow path, or at least one radiating unit and at least one circuit board are placed in series on the same cooling flow path. In this case, it is difficult to optimize the heat dissipation efficiency of the radiating unit or the circuit board placed in downstream of the cooling flow path, and thus the projector cannot be thermally stabilized. Therefore, there needs to be a solution to thermally stabilize the projector.

SUMMARY

An aspect of the exemplary embodiments relates to a projector having an irradiating window in the center of the projector and at the same time having a minimized length, and having improved thermal stability.

According to an aspect of the exemplary embodiments, a projector displaying an image through a screen may include an optical system which forms an image and expands and projects the image, and which includes at least one light source; a light source dissipation unit for dissipating heat generated by the light source; a plurality of circuit boards for operating the projector; an intake unit having an intake opening where external air is received; an exhaust unit having an exhaust opening where received air is expelled; and a flow path dividing unit which separates a cooling flow path formed between the intake opening and the exhaust opening into an upper cooling flow path and a lower cooling flow path, wherein the light source dissipation unit is placed on the upper cooling flow path, and at least one of the plurality of circuit boards is placed on the lower cooling flow path.

The optical system may include an illuminating unit which includes at least one light source; an image forming unit which forms an image from light generated by the illuminating unit; a projection lens unit which expands and projects the image formed in the image forming unit; and an aspheric mirror which reflects the expanded and projected image towards the screen.

At least a portion of the aspheric mirror may be placed on the upper cooling flow path.

At least a portion of the projection lens unit may be placed on the upper cooling flow path.

The intake unit may include an intake frame where the intake opening is formed; and an intake fan placed in the intake opening.

The exhaust unit may include an exhaust frame where the exhaust opening is formed; and at least one exhaust fan placed in the exhaust opening.

The exhaust frame may include at least one upper exhaust opening placed on an upper side of the exhaust frame; and at least one lower exhaust opening placed on a lower side of the exhaust frame.

Air may flow between the flow path dividing unit and the intake opening, and the flow path dividing unit may extend from the lower portion of the intake frame towards the lower exhaust opening, and be a duct member where at least one of the plurality of the circuit boards is placed.

The duct member may include a first duct part where a power board is placed inside; and a second duct part which is in parallel to the first duct part, and where an LED driver is placed inside.

The aspheric mirror and the projection lens unit may be placed on an upper side of the duct member.

The illuminating unit may include a red-LED, blue-Led, and green-LED, and the light source dissipation unit may include a first LED dissipation unit, second LED dissipation unit, and third LED dissipation unit for cooling the red-Led, blue-Led, and green-LED, respectively.

The first LED dissipation unit, second LED dissipation unit, and third LED dissipation unit may be placed in parallel to one another so as to be adjacent to three upper exhaust openings.

An exhaust fan may be placed in each upper exhaust opening.

Each LED dissipation unit may include a heat pipe connected to its corresponding LED and a plurality of heat dissipating fins surrounding the heat pipe.

The intake frame may have a branch duct which divides a portion of received air, and a branch cooling flow path may be formed between the branch duct and the exhaust opening.

The image forming unit, sub-power board (SUB-SMPS) and Digital Micromirror Device (DMD) driving board may be placed on the branch cooling flow path.

The projection lens unit may include an inlet part which is placed to face the image forming unit; and an outlet part which is placed to face the aspheric mirror and is connected to the inlet part with an inclination, and the inlet part may be extended along a height direction of the projector.

The outlet part may be extended along a width direction of the projector and placed in a center of the projector in a longitudinal direction.

An inclination angle of the inlet part and the outlet part may be 90°.

The image forming unit may be a DMD panel.

According to another aspect of the exemplary embodiments, a display apparatus may include the aforementioned projector, and a screen which displays an image projected from the projector.

The display apparatus may be a television of 80 inches or more.

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION

Figure 1:
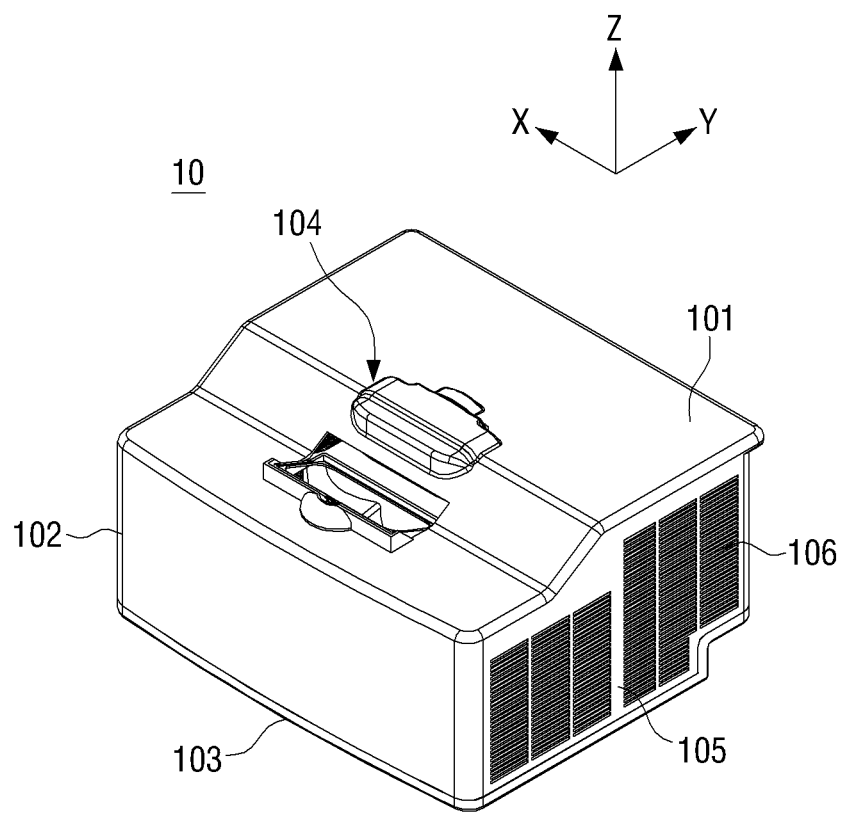
FIG. 1 is a perspective view of a projector according to an exemplary embodiment.

Certain exemplary embodiments are described in greater detail below with reference to the accompanying drawings.

In the following description, like drawing reference numerals are used for the like elements, even in different drawings. The matters described in the description, such as detailed construction and elements, are provided to assist in a comprehensive understanding of exemplary embodiments. However, exemplary embodiments can be practiced without those specifically described matters. Also, well-known functions or constructions are not described in detail since they would obscure the application with unnecessary detail.

Figure 2:
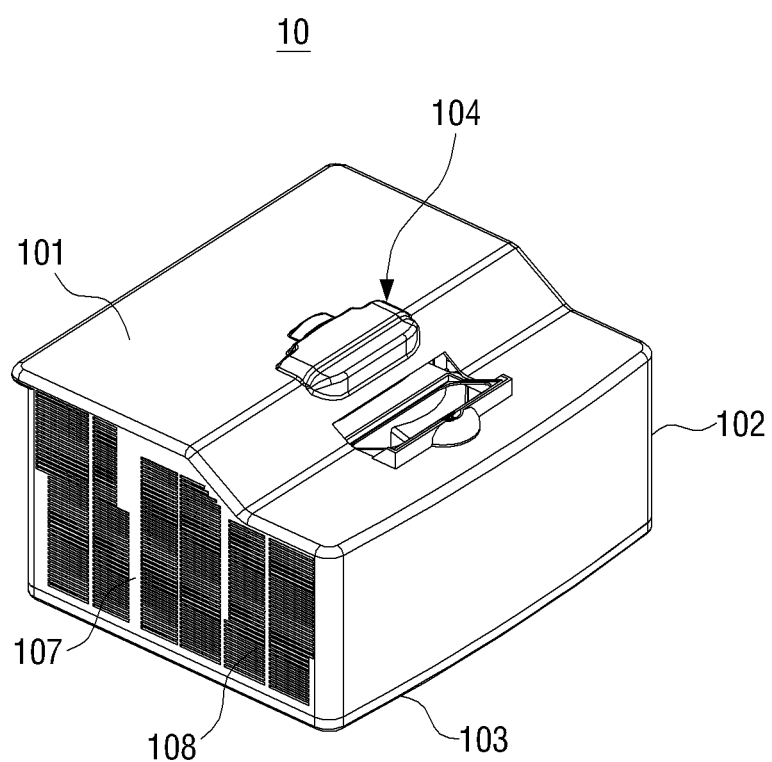
FIG. 2 is a perspective view of the projector in FIG. 1 seen from a different angle.

FIG. 1 is a perspective view of a projector according to an exemplary embodiment, and FIG. 2 is a perspective view of the projector in FIG. 1 seen from a different angle.

With reference to FIGS. 1 and 2, the projector 10 is roughly the shape of a rectangle. The projector 10 has an external case which contains internal components, and the external case may include a cover case 101, a side case 102, and a bottom case 103.

The cover case 101 has an irradiating window 104, and the projector 10 displays an image on a screen 20 (see FIG. 10) through the irradiating window 104. The irradiating window 104 is placed in a central position along a longitudinal direction (that is, x direction) of the projector 10.

On a right surface 105 of the side case 102, there are a plurality of air intake holes 106, and on a left surface 107 of the side case 102, there are a plurality of air exhaust openings 108. Through the air intake holes 106, air can flow into the projector 10 from outside, and through the air exhaust openings 108, the air that flows into the projector 10 can be expelled outside the projector 10.

Placed opposite the cover case 101, the bottom case 103 supports a plurality of internal components installed thereon.

Figure 3:
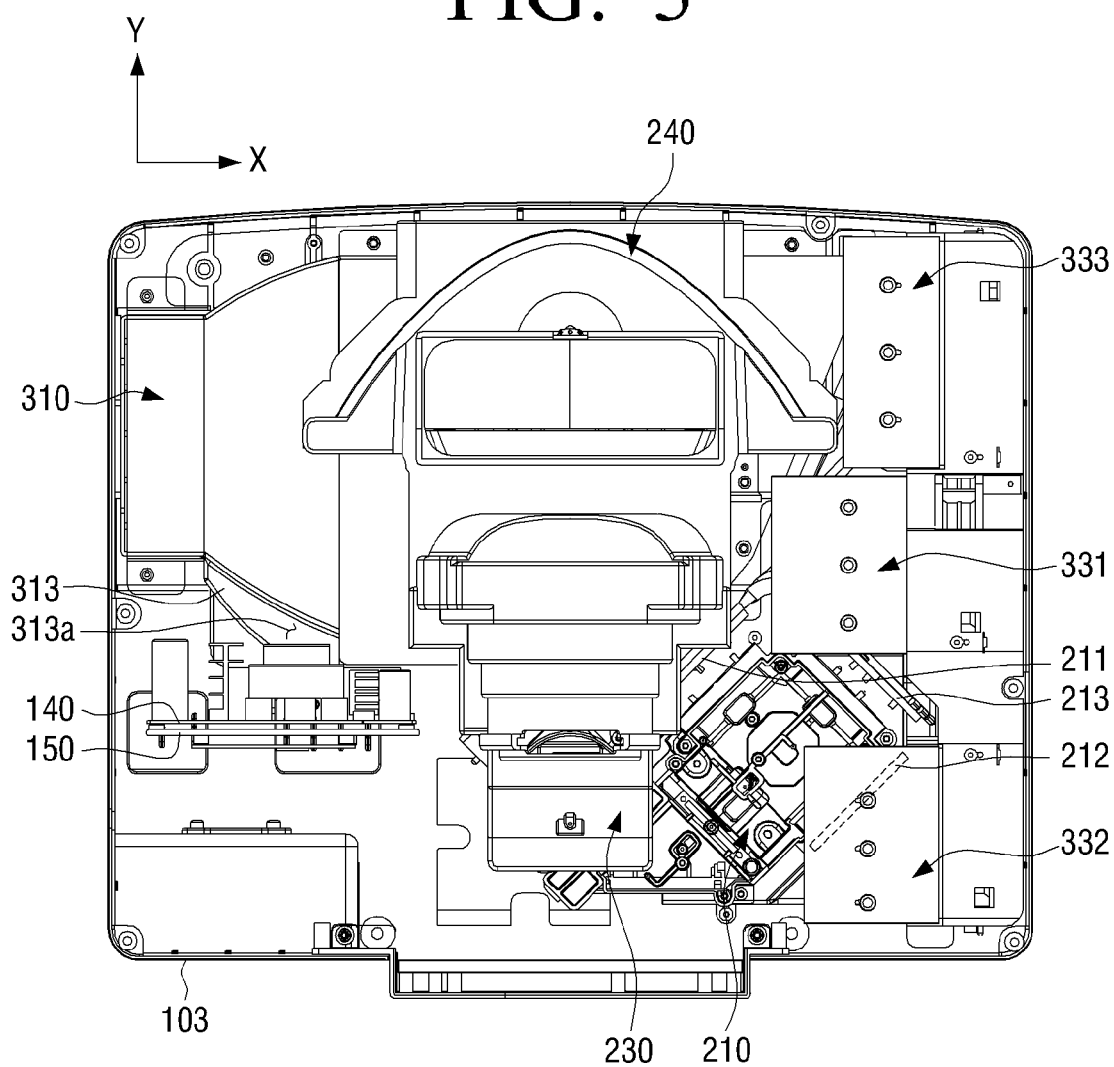
FIG. 3 is a top view of the projector in FIG. 1 with a cover case and a side case omitted.
Figure 4:
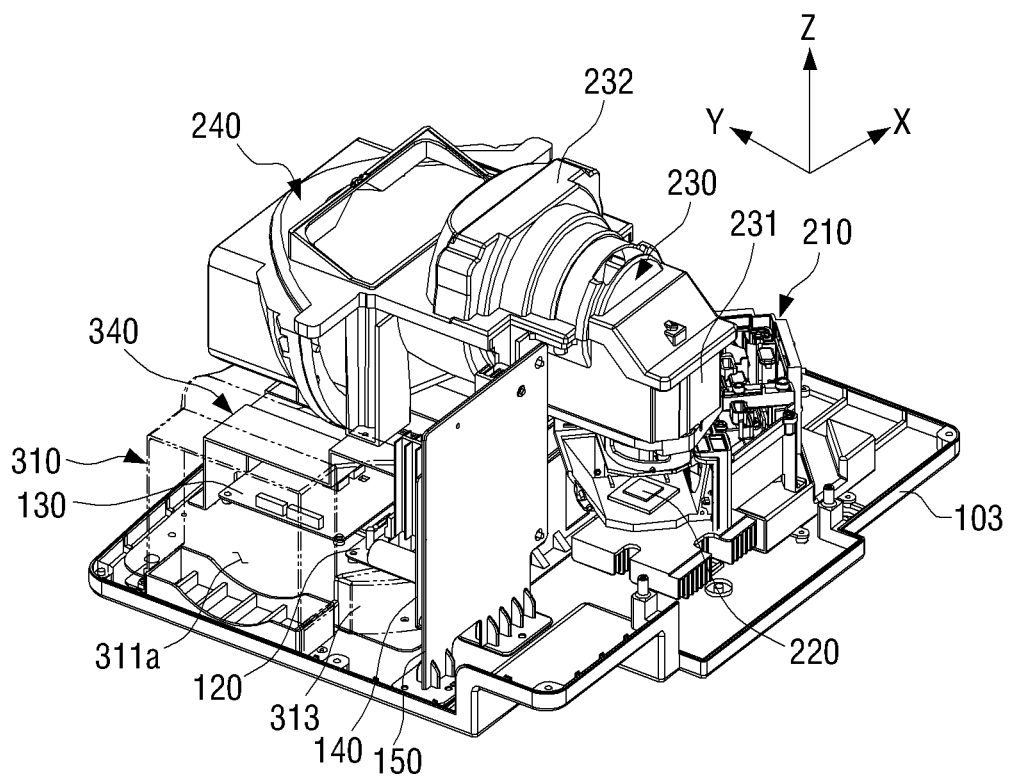
FIG. 4 is a perspective view of FIG. 2, with some components omitted for convenience of explaining.

FIG. 3 is a top view of the projector in FIG. 1 with the cover case and the side case omitted, and FIG. 4 is a perspective view of FIG. 2, with some components omitted for convenience of explaining.

With reference to FIGS. 3 and 4, a projector 10 according to an exemplary embodiment includes an optical system for forming an image and expanding and projecting the image. Such an optical system includes an illuminating unit 210, an image forming unit 220, a projection lens unit 230, and an aspheric mirror 240.

The illuminating unit 210 generates light to be used in forming an image. Thus, the illuminating unit 210 is equipped with a red R-LED 211, a blue B-LED 212, and a green G-LED 213 as light sources, which generate red light, blue light, and green light, respectively. As such, in the current exemplary embodiment, the illuminating unit 210 has three LEDs 211, 212, 213, but in other exemplary embodiments, an illuminating unit 210 may have other types of light sources such as a lamp which generates white light (for example, an arc lamp, a halogen lamp etc.).

As illustrated, R-LED 211 and B-LED 212 are placed opposite to each other, while G-LED 213 is placed vertically to R-LED 211 and B-LED 212. The illuminating unit 210 also has a dichroic filter between the R-LED 211 and the B-LED 212, although it is not illustrated in the figures. The dichroic filter reflects red light and blue light in approximately 90°, but penetrates green light as it is. Thus, the red light and blue light generated by R-LED 211 and B-LED 212 are reflected in 90° by the dichroic filter and head towards the image forming unit 220, whereas green light generated by G-LED 213 penetrates the dichroic filter and heads towards the image forming unit 220. Therefore, white light consisting of the red light, blue light and green light of the LEDs 211, 212, 213 may be provided to the image forming unit 220.

The image forming unit 220 is placed in parallel to the bottom case 103, that is, on an X-Y surface. The image forming unit 220 according to this exemplary embodiment is embodied as a DMD panel. The DMD panel includes a plurality of micro mirrors, and each micro mirror corresponds to an image pixel. Images are formed from light that the illuminating unit 210 generates, as the micro mirrors are turned on and off according to image signals. The projector 10 includes at least one reflecting mirror (not illustrated) which reflects the white light generated by the illuminating unit 210 towards the image forming unit.

The projection lens unit 230 expands and projects the image formed by the image forming unit 220 towards the aspheric mirror 240. Such a projection lens unit 230 comprises an inlet part 231 which faces the image forming unit 220 and an outlet part 232 which faces the aspheric mirror 240. The outlet part 232 has a plurality of projection lenses (not illustrated) for expanding images inside. The inlet part 231 and the outlet part 232 are connected in a ']' shape, and there is a folding mirror (not illustrated) in the connecting part. Thus, the image formed by the image forming unit 220 goes into the inlet part 231 of the projection lens unit 230, and is then reflected by the folding mirror, expanded by the projection lens inside the outlet part 232, and projected on the aspheric mirror 240.

As mentioned above, although the projection lens unit 230 has a ']' shape, the inlet part 231 of the projection lens unit 230 is extended along a height direction of the projector 10 (that is, the z direction). Thus, as the inlet part 231 of the projection lens unit 230 is extended in the height direction of the projector 10 (that is, up and down), the outlet part 232 of the projection lens unit 230 can be placed in a center of the projector 10 along the longitudinal direction of the projector 10 (that is, x direction). As the outlet part 232 is placed in the center of the projector 10, the irradiating window 104 provided in the cover case 101 (see FIG. 1) can also be placed in the center of the projector 10, which is the most desirable position for the irradiating window 104 in terms of an design.

If the inlet part 231 is extended along the longitudinal direction and not the height direction, the inlet part 232 of the projection lens unit 230 could not be placed in the center of the projector 10 and instead placed biased to the left or right. It would be possible to offset the bias of the outlet part 232 by extending the cases 101, 102, 103 of the projector 10 in the opposite direction to which the outlet part 232 is biased towards (for instance, towards right if the outlet part is biased towards the left), but that would increase the length of the projector 10, which is disadvantageous in terms of minimizing its size.

In the case of this exemplary embodiment, since the inlet part 231 of the projection lens unit 230 is extended up and down, it is possible to place the outlet part 232 of the projection lens unit 230 in the center of the projector 10 without any extension of the cases 101, 102, 103. Therefore, it is possible to satisfy the minimized design requirements while achieving the goal of placing the irradiating window 104 in the center of the projector 10 by placing the outlet part 232 in the center of the projector 10.

The aspheric mirror 240 is placed to face the outlet part 232 of the projection lens unit 230. Thus, the aspheric mirror 240 displays the image expanded and projected by the projection lens unit 230 on the screen through the irradiating window 104 provided in the cover case 101. Since the projector 10 according to this exemplary embodiment displays the image through the aspheric mirror 240, the distance with the screen can be much shorter compared to when it is not. That is, the projector 10 according to this exemplary embodiment is a short focus projector which has a significantly small throw ratio compared to conventional projectors. Herein, the throw ratio can be defined as "projection distance/screen width".

The projector 10 also includes a plurality of circuit boards. That is, as illustrated in FIG. 4, the projector 10 includes circuit boards such as a power board (SMPS) 120, LED driver 130, sub-power board (SUB-SMPS) 140, and DMD driver 150. Herein, the power board 120 is a circuit board which supplies the electricity needed in the projector 10, the LED driver 130 is a circuit board which drives the aforementioned LEDs 211, 212, 213, the sub-power board 140 is an ancillary board for driving the LED driver 130, and the DMD driver 150 is a circuit board for driving the DMD panel (image forming unit 220). As illustrated in FIG. 4, the power board 120 and the LED driver 130 are placed in an x direction in parallel to the bottom case 130, while the sub-power board 140 and the DMD driver 150 are placed in a z direction vertically to the bottom case 130.

The projector 10 according to this exemplary embodiment has a cooling system for cooling the internal components. The cooling system of the projector 10 is explained in more detail with reference to FIGS. 5 to 9.

Figure 5:
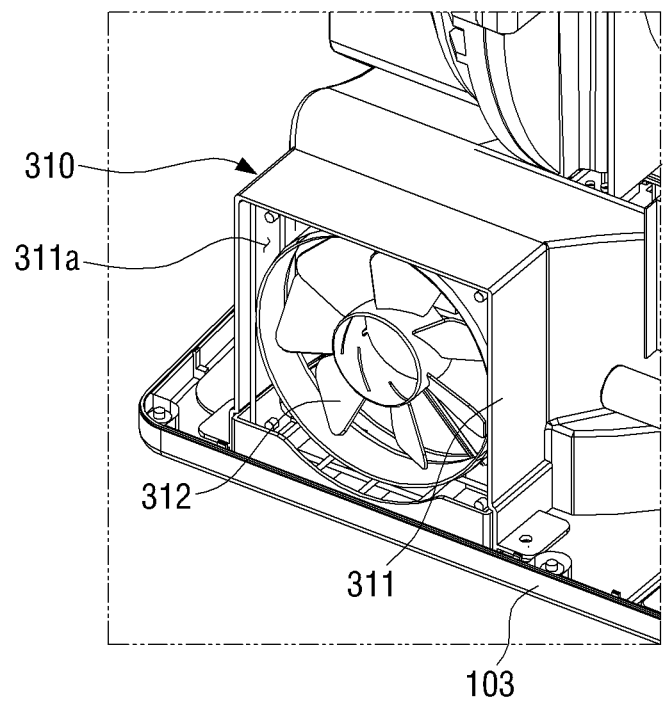
FIG. 5 is a perspective view to illustrate an intake unit of the projector.
Figure 6:
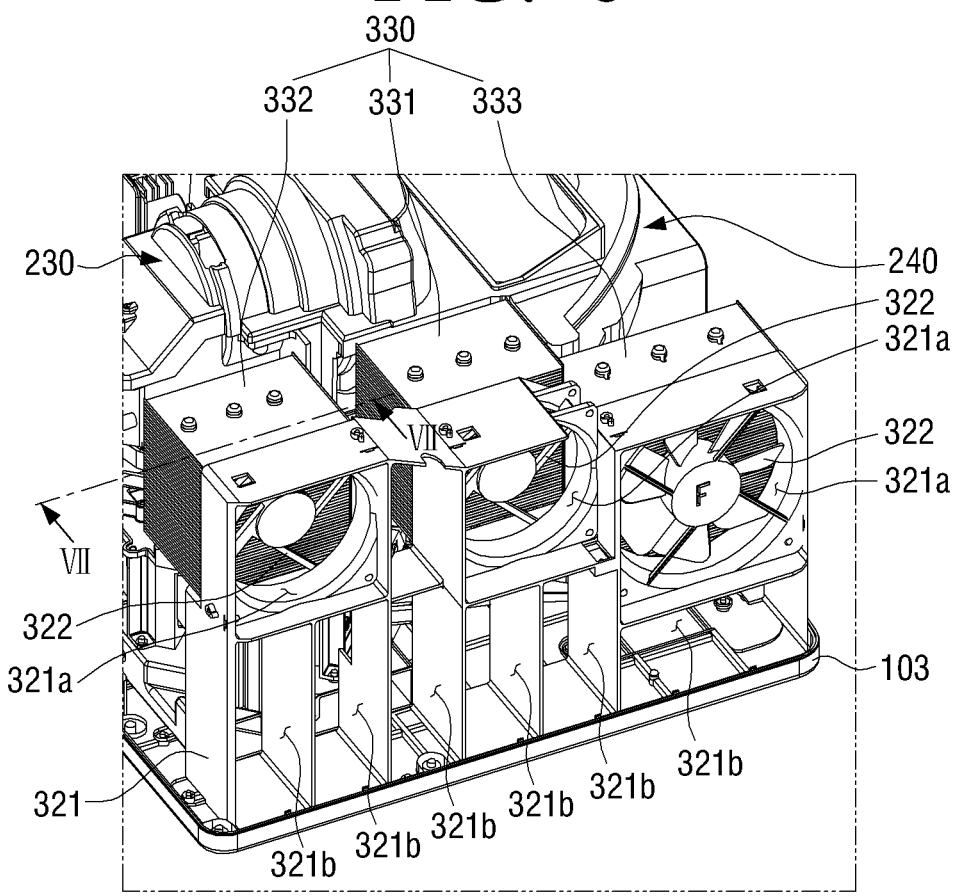
FIG. 6 is a perspective view to illustrate an exhaust unit and a light source dissipation unit of the projector.
Figure 7:
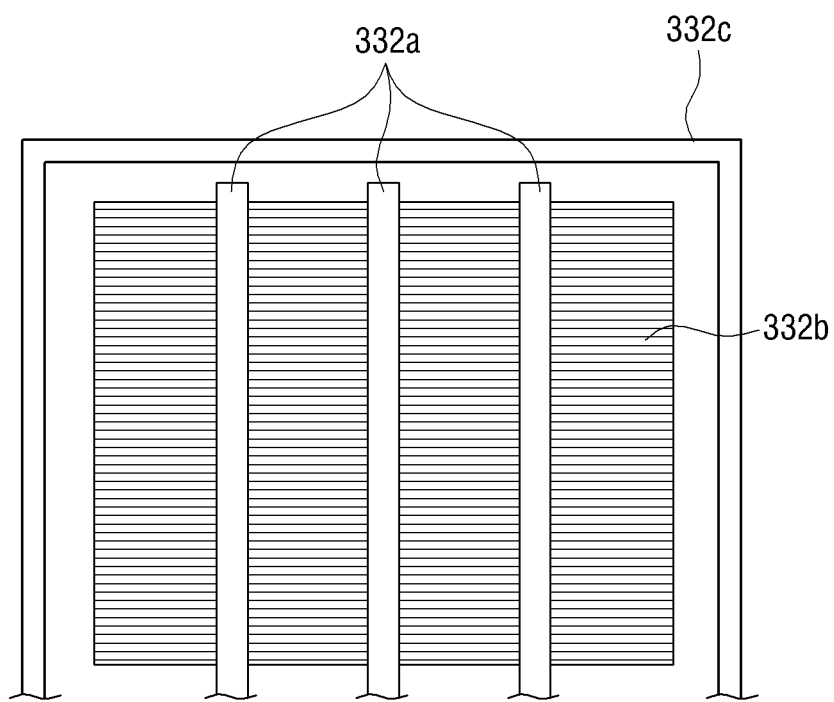
FIG. 7 is a cross-sectional view of FIG. 6 cut along line VII-VII to explain the light source dissipation unit.
Figure 8:
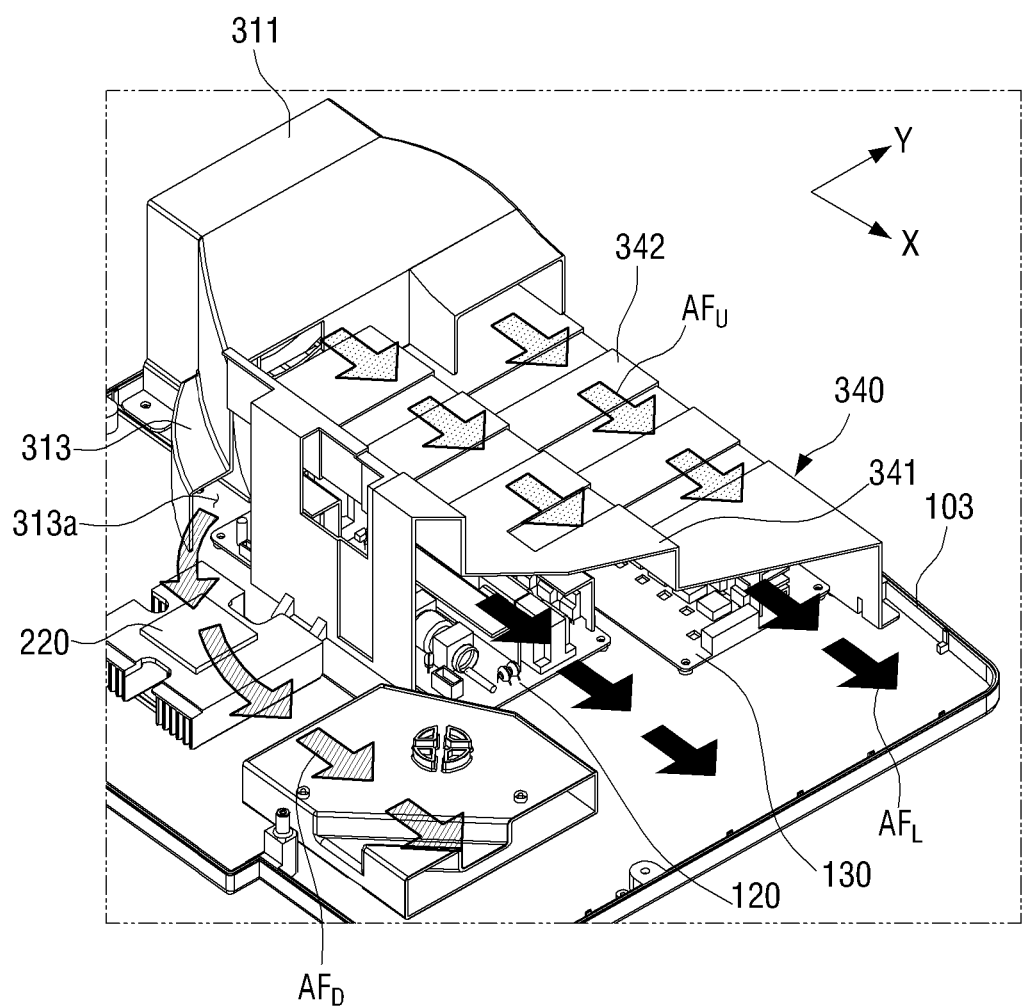
FIG. 8 is a perspective view to illustrate a flow path dividing unit of the projector.

FIG. 5 is a perspective view illustrating an intake unit, FIG. 6 is a perspective view illustrating an exhaust unit and a light source dissipation unit, FIG. 7 is a cross-sectional view of FIG. 6 cut along line VII-VII to explain the light source dissipation unit, and FIG. 8 is a perspective view illustrating a flow path dividing unit.

With reference to FIGS. 5 to 9, the cooling system of the projector 10 includes an intake unit 310, an exhaust unit 320, a light source dissipation unit 330, and a flow path dividing unit 340.

As illustrated in FIG. 5, the intake unit 310 includes an intake frame 311 and an intake fan 312. The intake frame 311 is placed to face a right surface 105 (see FIG. 1) of the side case 102. In addition, on the intake frame 311, an intake opening 311a is formed to receive external air, and on the intake opening 311a, an intake fan 312 is provided so that external air is received through the intake opening 311a. Meanwhile, the intake frame 311 has a branch duct 313 (see FIGS. 3 and 8) on its lower side. A portion of the air received through the intake opening 311a is guided towards the aforementioned image forming unit (DMD panel 220) by the branch duct 313.

As illustrated in FIG. 6, the exhaust unit 320 includes an exhaust frame 321 and exhaust fans 322. The exhaust frame 321 is placed to face a left surface 107 (see FIG. 1) of the side case 102. In addition, the exhaust frame 321 has an exhaust opening for exhaust the received air, and the exhaust opening consists of three upper exhaust openings 321a placed on the upper part of the exhaust frame 321 and six lower exhaust openings 321b placed on the lower part of the exhaust frame 321. In each of the three upper exhaust openings 321a of the exhaust frame 321, an exhaust fan 322 is placed.

As illustrated in FIG. 6, the light source dissipation unit 330 which cools the light source includes a first LED dissipation unit 331, a second LED dissipation unit 332, and a third LED dissipation unit 333. Each of the LED dissipation units 331, 332, 333 is placed to face one exhaust fan 322, and thus is cooled by the air expelled outside through the upper exhaust opening 321a. Each of the first LED dissipation unit 331, second LED dissipation unit 332 and third LED dissipation unit 333 is connected to the R-LED 211, B-LED 212 and G-LED 213 of the illuminating unit 210 (see FIG. 3), respectively. As illustrated in FIG. 7, the second LED dissipation unit 332 includes a heat pipe 332a connected to the B-LED 212, a plurality of heat dissipating fins 332b surrounding the heat pipe 332a, and a housing 332c surrounding the heat dissipating fins 332b. Therefore, the heat generated in the B-LED 212 can be expelled outside through the heat pipe 332a and the radiating fin 332b. Like the second LED dissipation unit 332, the first and third LED dissipation units 331, 333 include a heat pipe, heat dissipating fins and housing.

As illustrated in FIG. 8, the flow path dividing unit 340 is a duct member extended along the longitudinal direction (that is, x direction) of the projector 10 from the lower part of the intake frame 311. Fluid may flow between the flow path dividing unit 340 and the intake opening 311a (see FIG. 5) formed in the intake frame 311. The flow path dividing unit 340 includes a first duct part 341 and a second duct part 342 placed in a more left side of the first duct part 341. The height of the first duct part 341 is a little higher than that of the second duct part 342, and thus the first duct part 341 and the second duct part 342 are placed in parallel to each other having a short gap. As illustrated in FIG. 8, the power board 120 is placed inside the first duct part 341, while the LED driver 130 is placed in the second duct part 342.

A portion of the air received by the flow path dividing unit 340 through the intake opening 311a is guided along the lower portion of the projector 10 towards the exhaust frame 321 (see FIG. 6) through the flow path dividing unit 340, while the other portion of the received air is guided along the upper portion of the projector 10 towards the exhaust frame 321 through the external part of the flow path dividing unit 340. That is, the cooling flow path formed between the intake opening 311a and the exhaust openings 321a, 321b is divided into an upper cooling flow path and a lower cooling flow path by the flow path dividing unit 340.

Accordingly, the received air flowing along the upper cooling flow path is expelled outside through the upper exhaust opening 321a of the exhaust frame 321, while the received air flowing along the lower cooling flow path is expelled outside through the lower exhaust opening 321b of the exhaust frame 321. "$AF_U$" in FIG. 8 represents the flow of the received air flowing along the upper cooling flow path or the upper cooling flow path itself, while "$AF_L$" represents the flow of the received air along the lower cooling flow path or the lower cooling flow path itself.

Meanwhile, as mentioned above, the intake frame 311 has a branch duct 313 on one side, and through this branch duct 313, a portion of the received air is guided towards the image forming unit 220. With reference to FIG. 8, the branch duct 313 of the intake frame 311 is provided in the lower part of the intake frame 311. Therefore, the received air flowing through the branch duct 313 is guided towards the lower exhaust opening 321b of the exhaust frame 321, and thus expelled outside through the lower exhaust opening 321b. "$AF_D$" in FIG. 8 represents the flow of the received air along the branch cooling flow path formed by the branch duct 313 of the intake frame 311 or the branch cooling flow path itself.

Figure 9:
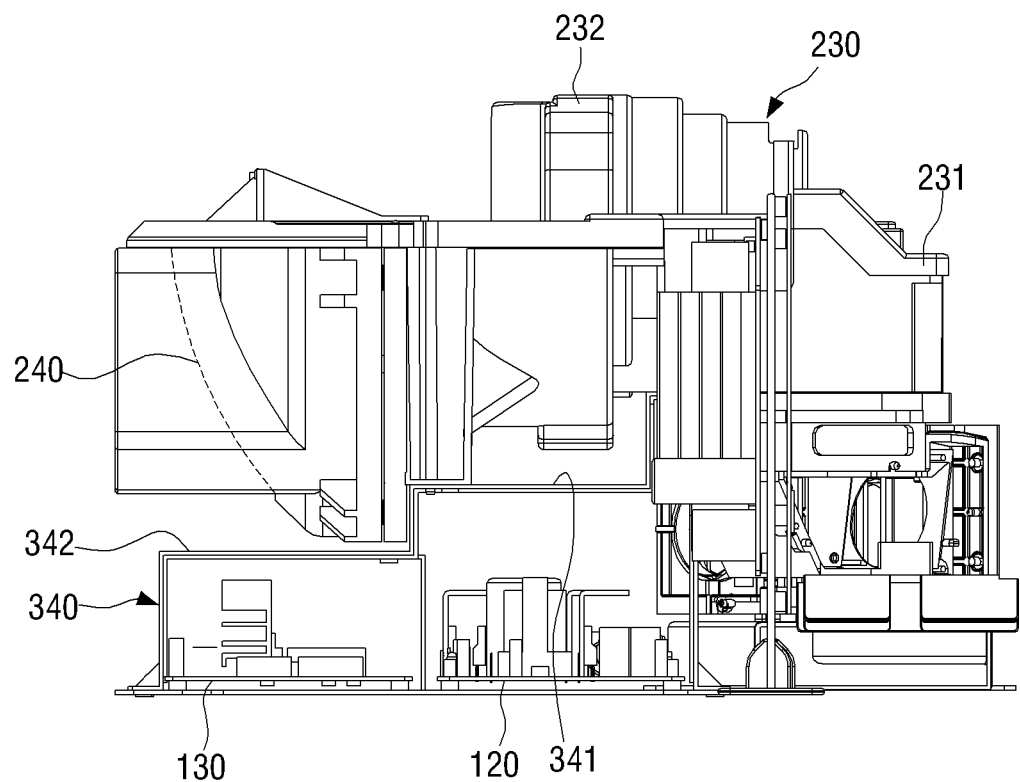
FIG. 9 is a side view to illustrate cooling of an aspheric mirror and a projection lens unit.

A cooling process and its effects are explained in more detail below with reference to FIG. 9, along with the aforementioned FIGS. 5 to 8. FIG. 9 is a side view for illustrating cooling of an aspheric mirror and a projection lens unit.

As illustrated in FIG. 5, external air is received into the projector 10 through the intake opening 311a of the intake frame 311 by the inhaling force of the intake fan 312, and as illustrated in FIG. 8, the received air flows along the upper cooling flow path $AF_U$, the lower cooling flow path $AF_L$, and the branch cooling flow path $AF_D$.

First of all, a cooling process by the upper cooling flow path $AF_U$ will be described in detail (see FIG. 8).

As illustrated in FIG. 9, the projection lens unit 230 is placed in the upper portion of the first duct part 341 of the flow path dividing unit 340, and the aspheric mirror 240 is placed in the upper part of the second duct part 342 of the flow path dividing unit 340. Therefore, the received air flowing along the upper cooling flow path $AF_U$ cools the projection lens unit 230 and the aspheric mirror 240. Thereafter, as illustrated in FIG. 6, the received air flowing along the upper cooling flow path $AF_U$ cools the light source dissipation unit 330, and then is expelled through the upper exhaust opening 321a.

As such, since the aspheric mirror 240 is cooled by the received air flowing along the upper cooling flow path $AF_U$, deformation of the aspheric mirror 240 due to increase of temperature can be prevented. Deformation of the aspheric mirror 240 may severely deteriorate the quality of images. However, the projector 10 according to this exemplary embodiment cools the aspheric mirror 240 through the upper cooling flow path $AF_U$, and thus such deterioration of images can be prevented.

Meanwhile, as the received air passes the projection lens unit 230 and the aspheric mirror 240 before it reaches the light source dissipation unit 330, its temperature rises slightly, but since the projection lens unit 230 and the aspheric mirror 240 have significantly lower temperatures than the LEDs 211, 212, 213, such temperature increase has almost no effect on the cooling efficiency.

In addition, since an exhaust fan 322 is provided in each upper exhaust opening 321a, the speed with which the received air flows through the light source dissipation unit 330 is higher than the speed with which the received air flows through the lower exhaust opening 321b. Therefore, cooling of the LEDs 211, 212, 213 having high temperatures can be achieved effectively. In addition, as illustrated in FIG. 6, since three LED dissipation units 331, 332, 333 are placed in parallel to one another; they do not affect the cooling efficiency of each other. If at least two of the LED dissipation units 331, 332, 333 are placed in series, the cooling efficiency of the LED dissipation unit placed in downstream can be reduced by the LED dissipation unit placed in upstream.

Next, the cooling process by the lower cooling flow path $AF_L$ will be described in detail (see FIG. 8).

As illustrated in FIG. 8, the received air which flows along the lower cooling flow path $AF_L$ cools the power board 120 and the LED driver 130 placed within the flow path dividing unit 340. Thereafter, as illustrated in FIG. 6, the received air which flows along the lower cooling flow path $AF_L$ is expelled outside through the lower exhaust opening 321b of the exhaust frame 321.

As such, the received air which flows along the lower cooling flow path $AF_L$ cools only the power board 120 and the LED driver 130, and thus cooling of the power board 120 and the LED driver 130 can be achieved efficiently. That is, since the received air which flows along the lower cooling flow path $AF_L$ does not meet another object to be cooled until it reaches the power board 120 and the LED driver 130, the cooling efficiency of the power board 120 and the LED driver 130 can be improved. Since the cooling of the power board 120 and the LED driver 130 is performed independently from the cooling of the light source dissipation unit 330, and a high cooling efficiency of the power board 120 and the LED driver 130 can be guaranteed.

Lastly, a cooling process by the branch cooling flow path $AF_D$ will be described in detail. (see FIG. 8).

As illustrated in FIG. 8, the received air which flows along the branch cooling flow path $AF_D$ cools the image forming unit (DMD panel) 220. In addition, with reference to FIG. 3 again, it can be seen that the exhaust holes 313a of the branch duct 313 which forms the branch cooling flow path $AF_D$ head towards the sub-power board 140 and the DMD driving board 150. That is, the image forming unit 220, the sub-power board 140, and the DMD driving board 150 may be placed on the branch cooling flow path $AF_D$. Therefore, the received air which flows along the branch cooling flow path $AF_D$ cools the sub-power board 140, the DMD driving board 150, and the image forming unit 220. After cooling the image forming unit 220, the received air which flows along the branch cooling flow path $AF_D$ is expelled outside through the lower exhaust opening 321b of the exhaust frame 321.

As such, the projector 10 according to this exemplary embodiment forms the branch cooling flow path $AF_D$ by the branch duct 313, and cools the sub-power board 140, DMD driving board 150, and the image forming unit (DMD panel) 220 through that branch cooling flow path $AF_D$. Since the cooling of the sub-power board 140, DMD driving board 150, and the image forming unit 220 are performed independently from the cooling of the light source dissipation unit 330, a high cooling efficiency of the power board 120 and the LED driver 130 can be guaranteed.

As mentioned above, the projector 10 according to this exemplary embodiment cools the projection lens unit 230, aspheric mirror 240, and light source dissipation unit 330 by the upper cooling flow path $AF_U$, cools the power board 120 and the LED driver 130 by the lower cooling flow path $AF_L$, and cools the sub-power board 140, DMD driving board 150 and the image forming unit 220 by the branch cooling flow path $AF_D$.

These upper cooling flow path $AF_U$, lower cooling flow path $AF_L$, and branch cooling flow path $AF_D$ are independent from one another, and thus the projector 10 can be thermally stabilized. Cooling of the various circuit boards 120, 130, 140, 150 and the image forming unit 220 placed in the lower cooling flow path $AF_L$ and the branch cooling flow path $AF_D$ are not affected by the upper cooling flow path $AF_U$, and therefore its efficiency can be improved significantly.

In addition, as mentioned above, since the projector 10 according to this exemplary embodiment cools the aspheric mirror 240 through the upper cooling flow path $AF_U$, deterioration of the quality of images due to thermal deformation of the aspheric mirror 240 can be prevented.

In addition, since in the projector 10 according to this exemplary embodiment, the LED dissipation units 331, 332, 333 are placed in parallel to one another, the cooling efficiency of the LED dissipation units 331, 332, 333 can be further improved.

Figure 10:
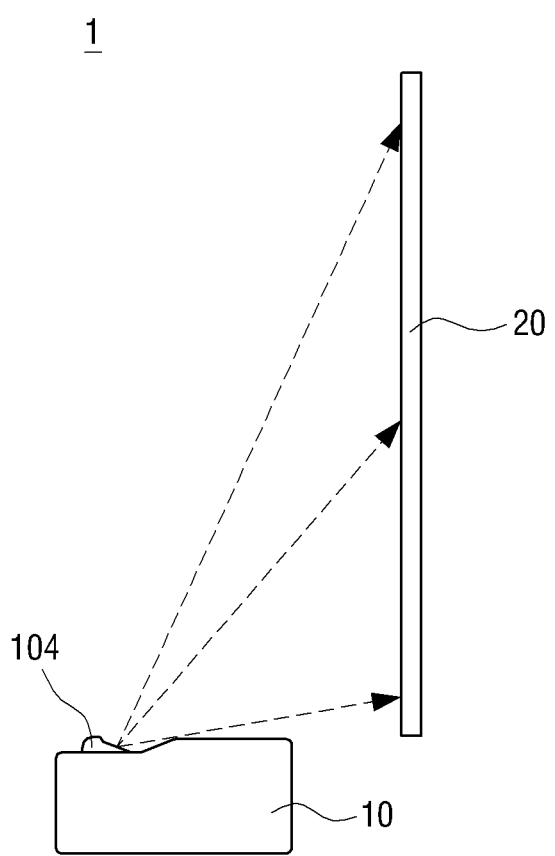
FIG. 10 is a side view of an outline of a display apparatus according to an exemplary embodiment.

FIG. 10 is a side view of an outline of a display apparatus according to an exemplary embodiment.

With reference to FIG. 10, the display apparatus 1 according to an exemplary embodiment of the present disclosure represents a television of a projection method. The display apparatus 1 includes a projector 10 and a screen 20 illustrated hereinabove.

An image formed in the projector 10 is displayed on the screen 20 as it is irradiated through the irradiating window 104. The screen 20 may have a large scale screen of more than 80 inches, and even in this case, the projector 10 in FIG. 1 is a short focus projector which has a small throw ratio, and thus the distance between the projector 10 and the screen 20 may be set to be relatively close (for example, 0.2 to 0.5 m).

In FIG. 10, the display apparatus 1 was illustrated as being a television, but those skilled in the art would obviously know that the present disclosure is not limited to a television and thus can be applied to other types of display apparatuses as well.

Although a few exemplary embodiments have been shown and described, it would be appreciated by those skilled in the art that changes may be made to the exemplary embodiments without departing from the principles and spirit of the inventive concept, the scope of which is defined in the claims and their equivalents.

What is claimed is:

1. A projector displaying an image through a screen, the projector comprising: an optical system which forms, expands, and projects the image, and which comprises at least one light source; a light source dissipation unit which dissipates heat generated by the light source; a plurality of circuit boards which operate the projector; an intake unit comprising an intake opening where external air is received; an exhaust unit comprising an exhaust opening where received air is expelled; and a flow path dividing unit which divides a cooling flow path formed between the intake opening and the exhaust opening into an upper cooling flow path and a lower cooling flow path, wherein the light source dissipation unit is placed on the upper cooling flow path, and at least one of the plurality of the circuit boards is placed on the lower cooling flow path: wherein the exhaust unit further comprises: an exhaust frame where the exhaust opening is formed: and at least one exhaust fan placed in the exhaust opening, and wherein the exhaust frame comprises: at least one upper exhaust opening placed on an upper side of the exhaust frame; and at least one lower exhaust opening placed on a lower side of the exhaust frame.

2. The projector according to claim 1, wherein the optical system further comprises: an illuminating unit comprising the at least one light source; an image forming unit which forms an image from light generated by the illuminating unit; a projection lens unit which expands and projects the image formed in the image forming unit; and an aspheric mirror which reflects the expanded and projected image towards the screen.

3. The projector according to claim 2, wherein at least a portion of the aspheric mirror is placed on the upper cooling flow path.

4. The projector according to claim 2, wherein at least a portion of the projection lens unit is placed on the upper cooling flow path.

5. The projector according to claim 4, wherein the intake unit further comprises:
an intake frame where the intake opening is formed; and
an intake fan placed in the intake opening.

6. The projector according to claim 1, wherein air flows between the flow path dividing unit and the intake opening, and
wherein the flow path dividing unit is extended from the lower portion of the intake frame towards the lower exhaust opening, and is a duct member where at least one of the plurality of the circuit boards is placed.

7. The projector according to claim 6, wherein the duct member comprises:
a first duct part where a power board is placed inside; and
a second duct part which is in parallel to the first duct part, and where an LED driver is placed inside.

8. The projector according to claim 7, wherein the aspheric mirror and the projection lens unit are placed on an upper side of the duct member.

9. The projector according to claim 1, wherein the illuminating unit further comprises a red-LED, blue-Led, and green-LED, and
the light source dissipation unit comprises a first LED dissipation unit, second LED dissipation unit, and third LED dissipation unit each of which cool the red-Led, blue-Led, and green-LED, respectively.

10. The projector according to claim 9, wherein the first LED dissipation unit, second LED dissipation unit, and third LED dissipation unit are placed in parallel to one another so as to be adjacent to three upper exhaust openings.

11. The projector according to claim 10, wherein an exhaust fan is disposed in each of the three upper exhaust opening.

12. The projector according to claim 10, wherein each LED dissipation unit comprises a heat pipe connected to its corresponding LED and a plurality of heat dissipating fins surrounding the heat pipe.

13. The projector according to claim 5, wherein the intake frame has a branch duct which separates a portion of received air, and a branch cooling flow path is formed between the branch duct and the exhaust opening.

14. The projector according to claim 13, wherein the image forming unit, sub-power board, and Digital Micromirror Device (DMD) driving board are placed on the branch cooling flow path.

15. The projector according to claim 2, wherein the projection lens unit comprises:
an inlet part which is placed to face the image forming unit; and
an outlet part which is placed to face the aspheric minor and is connected to the inlet part with an incline, and
the inlet part is extended along a height direction of the projector.

16. The projector according to claim 15, wherein the outlet part is extended along a width direction of the projector and is placed in a center of the projector in a longitudinal direction.

17. The projector according to claim 15, wherein an angle of incline of the inlet part and the outlet part is 90 [deg.].

18. The projector according to claim 2, wherein the image forming unit is a Digital Micromirror Device (DMD) panel.

19. A display apparatus comprising a projector and a screen which displays an image projected from the projector, wherein the projector comprises: an optical system which forms, expands, and projects the image, and which comprises at least one light source; a light source dissipation unit which radiates generated heat of the light source; a plurality of circuit boards which operate the projector; an intake unit comprising an intake opening where external air is received; an exhaust unit comprising an exhaust opening where received air is expelled; and a flow path dividing unit which divides a cooling flow path formed between the intake opening and the exhaust opening into an upper cooling flow path and a lower cooling flow path, and wherein the light source dissipation unit is placed on the upper cooling flow path and at least one of the plurality of circuit boards is placed on the lower cooling flow path, wherein the exhaust unit further comprises: an exhaust frame where the exhaust opening is formed; and at least one exhaust fan placed in the exhaust opening, and wherein the exhaust frame comprises: at least one upper exhaust opening placed on an upper side of the exhaust frame; and at least one lower exhaust opening placed on a lower side of the exhaust frame.

20. The display apparatus according to claim 19, wherein the display apparatus is a television of 80 inches or more.

\* \* \* \* \*